(12) United States Patent
Brown

(10) Patent No.: US 7,545,249 B2
(45) Date of Patent: Jun. 9, 2009

(54) MAGNETIZING FIXTURE WITH INSULATED CORE

(75) Inventor: Fred A. Brown, Coronado, CA (US)

(73) Assignee: Comair Rotron, Inc., San Diego, CA (US)

( * ) Notice: Subject to any disclaimer, the term of this patent is extended or adjusted under 35 U.S.C. 154(b) by 0 days.

(21) Appl. No.: 11/403,299

(22) Filed: Apr. 13, 2006

(65) Prior Publication Data
US 2006/0255893 A1     Nov. 16, 2006

Related U.S. Application Data

(62) Division of application No. 10/666,525, filed on Sep. 18, 2003, now Pat. No. 7,061,353.

(51) Int. Cl.
*H01F 13/00* (2006.01)
*H01F 7/20* (2006.01)

(52) U.S. Cl. ..................................... 335/284
(58) Field of Classification Search ............... 335/284
See application file for complete search history.

(56) References Cited

U.S. PATENT DOCUMENTS

| 366,544 | A | * | 7/1887 | Westinghouse, Jr. | 336/94 |
| 3,158,797 | A | | 11/1964 | Andrews | 335/284 |
| 4,381,492 | A | | 4/1983 | Steingroever et al. | 335/284 |
| 5,075,814 | A | | 12/1991 | Kubota et al. | 361/143 |
| 5,471,357 | A | | 11/1995 | Ishizuka et al. | 360/99.08 |
| 5,663,601 | A | | 9/1997 | Wakabayashi et al. | 310/45 |
| 6,084,496 | A | | 7/2000 | Asano et al. | 335/284 |
| 6,124,776 | A | | 9/2000 | Aiello et al. | 335/284 |
| 6,272,729 | B1 | | 8/2001 | Reznik et al. | 29/598 |
| 6,664,703 | B2 | * | 12/2003 | Oketani et al. | 310/254 |

FOREIGN PATENT DOCUMENTS

| JP | 363202007 A | 8/1988 | 335/284 |
| JP | 401008848 A | 1/1989 | 335/284 |
| JP | 406098505 A | 4/1994 | 29/606 |

OTHER PUBLICATIONS

Thermal Spray Materials, pp. 1-3, Apr. 21, 2003, (http://www.precursortech.com/selfbonding.html, Jul. 25, 2003).
Development Products, pp. 1-3, Jun. 22, 2002 (http://www.altairnano.com/main_content/DevProducts.html, Aug. 27, 2003).

(Continued)

*Primary Examiner*—Ramon M Barrera
(74) *Attorney, Agent, or Firm*—Dobrusin & Thennisch PC

(57) ABSTRACT

A magnetizing fixture is provided for connection to an electrical power supply. Electrically conductive elements fit within channels connecting top and bottom surfaces of an electrically conductive core. One end of each electrically conductive element connects to a power supply and the other end to an electrically conductive top. An electrically insulating layer coating the channels and top and bottom surfaces of the electrically conductive core electrically isolates the electrically conductive elements from the electrically conductive core.

6 Claims, 6 Drawing Sheets

OTHER PUBLICATIONS

Magnetic Properties of Materials, pp. 1-8, Feb. 25, 2003 (http://www.eesurrey.ac.uk/Workshop/advice/coils/mu/, Sep. 12, 3003).

Silver Solder, Paste, Wire, Sheets, p. 1, Mar. 6, 2003 (http://www.pjsupply.com/solder.htm, Jul. 11, 2003).

Questions and Answers, p. 1, Apr. 5, 2003 (http://www.education.jlab.org/qa/meltingpoint_01.html, Jul. 11, 2003).

English, J., Addressing EMI Shielding Problems with Specially Engineered Materials, pp. 1-5, (http://www.ce-mag.com/archive/02/07/English,html, Sep. 17, 2003).

Padture, N.P., et al., Thermal Barrier Coatings for Gas-Turbine Engine Applications, et al., Science, vol. 296, pp. 280-284, Apr. 12, 2002.

Xiong, H., et al., Three-Dimensional Simulation of Plasma Spray Jet, Proceedings of HT 2003, ASME Summer Heat Transfer Conference, HT2003-47153, pp. 1-9, 2003.

Zirconia Felt Types ZYF-50 and ZYF-100, (http://www.zircarzirconia.com/ZYF-50ANDZYF-100.htm Aug. 27, 2003).

Zirconum- The Element, (http://www.zrchem.com/zrchemistry.htm) Aug. 27, 2003.

* cited by examiner

SECTION B-B

SECTION A-A

SECTION B-B

SECTION D-D

MAGNETIZING FIXTURE WITH INSULATED CORE

PRIORITY

This application is a divisional application of U.S. patent application Ser. No. 10/666,525, filed Sep. 18, 2003, now U.S. Pat. No. 7,061,353 and which is hereby incorporated by reference in its entirety.

TECHNICAL FIELD

The present invention relates to a magnetizing fixture, and more particularly, to a magnetizing fixture of motor magnets.

BACKGROUND ART

Magnets are employed in a variety of appliances where the application often dictates the physical shape of the magnet and the pattern of magnetization. For example, the rotor of a DC motor incorporates a magnet in the shape of a hollow cylinder where the magnetization is generally radial, that is, perpendicular to the cylindrical walls. Although it is possible to construct various magnet shapes from several standard sized and shaped magnets, it is often preferable to achieve the desired magnetization with a single object having the desired shape.

During magnetization, an object to be permanently magnetized is placed in a region having a magnetic field with a particular configuration. To that end, such a magnetic field often is generated with a magnetizing system. One type of magnetizing system includes a magnetizer that supplies electrical current to a coupled magnetizing fixture. The fixture typically has an electrically conductive, non-permanently magnetizeable core of substantial magnetic permeablilty to concentrate and focus the magnetic fields produced by current flowing through a plurality of surrounding conductors. To begin magnetization, magnetizeable material to be permanently magnetized, e.g., steel, may be placed around or about the magnetizing fixture. The magnetizing system then generates a magnetic field to magnetize the material.

Proper configuration of the magnetic fields requires that electrical current flow only through the electrical conductors. Undesirably, because of contact between the conductors and the core, current often is diverted into the steel core. Current flowing through the core thus distorts both the resulting magnetic fields and, consequently, the subsequent permanent magnetization of the object being magnetized.

SUMMARY OF THE INVENTION

In accordance with one aspect of the invention, a magnetizing fixture is provided for connection to an electrical power supply. The magnetizing fixture has an electrically conductive structure with an electrically conductive top and several electrically conductive elements, the first ends connected to a power supply and the second ends to the electrically conductive top. An electrically conductive core of substantial magnetic permeability has a top surface coupled to the electrically conductive top and channels communicating from the top surface to the bottom surface of the core. Each electrically conductive element is contained in a channel. The top and bottom surfaces of the electrically conductive core and the channels are coated with an electrically insulating layer.

In accordance with an embodiment of the invention, the channels may be open and may completely contain the electrically conductive elements laterally.

In accordance with an additional embodiment of the invention, the insulating layer may contain several sublayers. In an embodiment where the insulating layer contains two sublayers, the first sublayer may contain nickel, chromium, and yttrium and the second may contain stabilized zirconia.

In accordance with a further embodiment of the invention, adjacent electrically conductive elements may be connected to different electrical connections.

In accordance with another aspect of the invention, a method is provided for constructing a magnetizing fixture. An electrically conductive structure that forms an interior and an electrically conductive core of substantial magnetic permeability are provided. After coating a part of the electrically conductive core with an electrically insulating material, the insulated core is secured within the interior of the conductive structure. Securing may be done by soldering the conductive structure to another structure, where the melting temperature of the electrically insulating material exceeds the soldering temperature.

In accordance with a further embodiment of the invention, channels may be formed in the electrically conductive core between a top and a bottom surface and the channels and top and bottom surfaces may be coated with the electrically insulating material. The electrically insulating material may include a first layer of nickel, chromium, aluminum, and yttrium, and a second layer of stabilized zirconia.

In accordance with a further aspect of the invention, a magnetizing fixture is provided with an electrically conductive element capable of receiving power from a power source, an electrically conductive core of substantial magnetic permeability positioned within the conductive element, and an insulator that prevents electrical contact between at least a portion of the conductive element and the conductive core.

In accordance with still another embodiment of the invention, an insulator may coat the conductive core.

In accordance with a still further embodiment of the invention, the conductive element may include legs electrically connected with a power source terminal. Each leg may have a first end and a second end, where the second ends of the legs may be connected together and each first end may be connected to a positive or negative power source terminal.

In accordance with a still additional embodiment of the invention, a connection material may connect a bar connected to a power supply port with the conductive element. The connection material may have a melting point less than the melting point of the insulator. The connection material may be a solder and, in certain embodiments, may be a silver solder.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Magnets are central to the operation of many motor-driven appliances. In the case of ordinary DC or brushless DC electric fans, rotating magnetic fields created by sequential excitation of electrical currents in stator windings interact with magnets located on a rotor to provide torque to rotate the rotor in a desired manner. The magnetic field established by the stator is designed to interact with the magnetic field established by the rotor magnets. For example, in single phase excitation, if the rotor contains six magnetic poles of particular angular width and distribution, the stator has a similar number and arrangement of magnetic poles. In the case of three phase excitation, there may be nine or more poles.

It is advantageous to construct the rotor magnet by magnetizing a single object of magnetizable material rather than from assembly of individual magnets. Among other reasons, assembly is simpler and more accurate. However, the advantages depend on the reliable magnetization of the rotor magnet.

Magnetization takes place when the object to be magnetized is positioned in the vicinity of magnetic fields that are consistent with the geometry of the object and the required magnetization pattern. For a cylindrical rotor magnet, the desired magnetization is radial in direction (i.e., through the thickness of the magnet) with equal numbers of north and south poles.

Magnetic fields generated by electrical currents flowing through conductors lack the focus required for effective magnetization of the object. Placement of conductors near suitably shaped magnetic material of substantial magnetic permeability may properly concentrate magnetic fields if no air gaps are present between the conductors and the shaped magnetic material. A magnetic material, such as cold rolled steel, possessing a magnetic permeability relative to the magnetic permeability free space of more than about 100 has substantial magnetic permeability. To preserve electrical isolation in the absence of physical isolation, various embodiments of the invention provide an electrically insulating material to separate the conductors and the shaped magnetic material.

Figure 1:
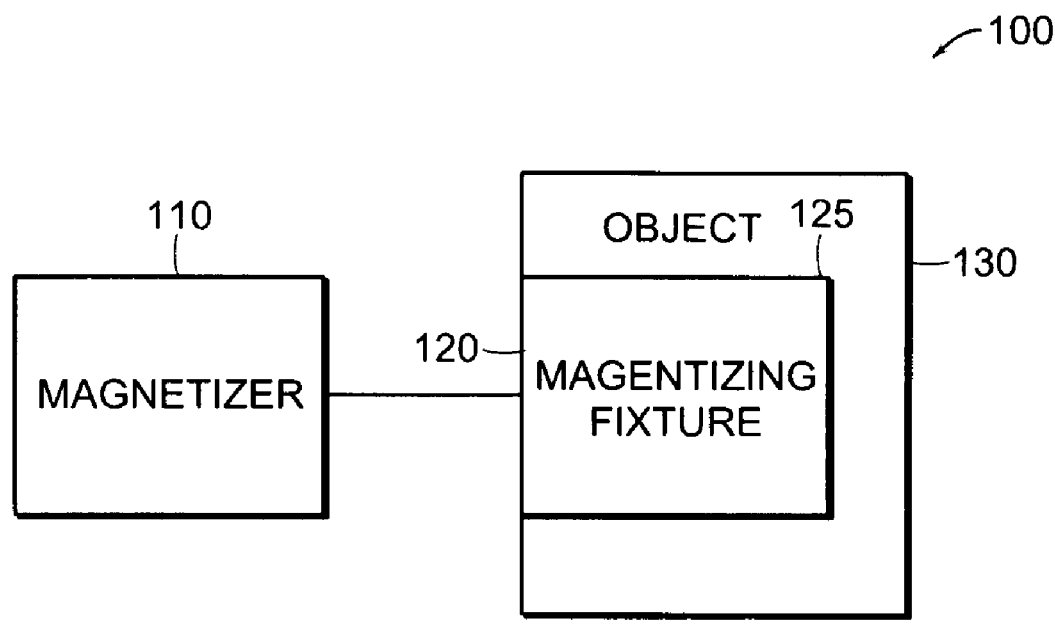
FIG. 1 shows an illustrative magnetizing system that can incorporate various embodiments of the invention.

FIG. 1 shows a magnetizing system 100 that may incorporate illustrative embodiments of the invention. The magnetizing system includes a magnetizer 110 that applies electrical current to an attached magnetizing fixture 120. In illustrative embodiments, a magnetizable object 130 is slipped over the outer surface 125 of fixture 120. Once the object 130 is in place, the magnetizer 110 delivers current to the fixture 120, thus producing a magnetic field. This magnetic field consequently permanently magnetizes the magnetizable object 130. Details of the interaction between the magnetizer 110 and the magnetizing fixture 120 are discussed below.

Figure 2:
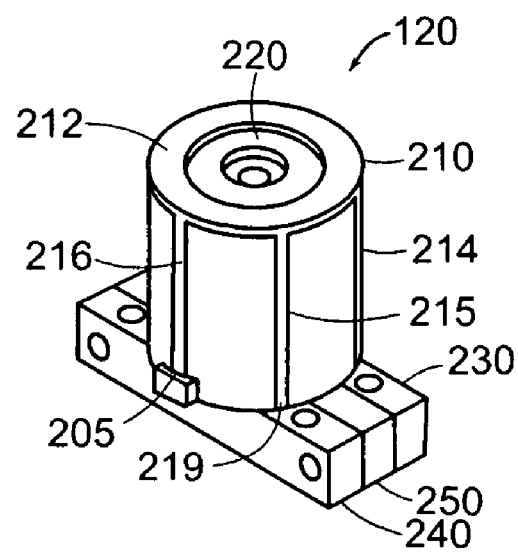
FIG. 2 shows schematically an embodiment of a magnetizing fixture.
Figure 3A:
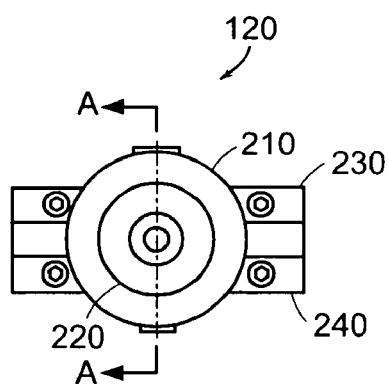
FIG. 3A is a schematic top view, FIG. 3B a schematic front view, FIG. 3C a schematic side view, and FIG. 3D a schematic cross-sectional view of the magnetizing fixture shown in FIG. 2.
Figure 3D:
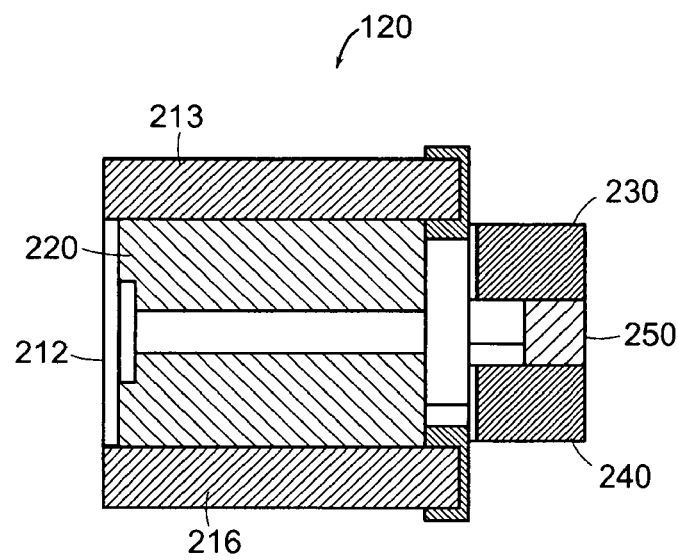
Figure 3B:
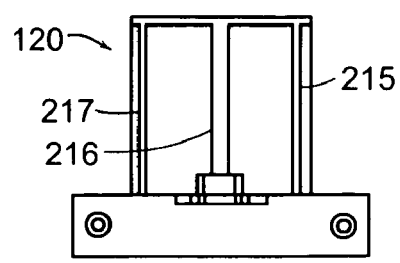
Figure 3C:
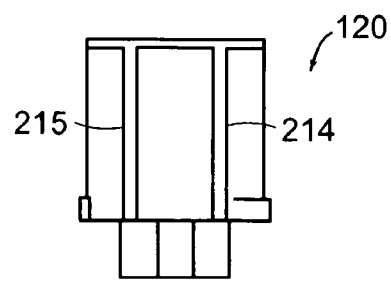

FIG. 2 schematically shows an embodiment of the magnetizing fixture 120 according to the present invention. The fixture includes an electrically conductive structure 210 surrounding an electrically conductive, non-permanently magnetizeable core 220 of substantial magnetic permeability. The electrically conductive structure 210 has an electrically conductive top 212 attached to second ends of a plurality of electrically conductive elements or legs 213-218 (213, 217, and 218 are shown in FIG. 4) extending therefrom. First ends, i.e., ends opposite from the top 212, (e.g., 219) of the electrically conductive elements 213-218 alternately couple to either a first electrical connection 230 or a second electrical connection 240. Thus, if a positive voltage source is coupled to the first electrical connection 230 and a negative voltage source is coupled to the second electrical connection 240, current flows away from the first electrical connection 230, through electrically conductive elements 214, 216, and 218, and through electrically conductive top 210 before returning to the second electrical connection 240 (through electrically conductive elements 215, 217, and 213.)

To further illustrate the magnetizing fixture 120, FIGS. 3A-3D schematically show top, front, side, and cross-sectional views of the magnetizing fixture 120, which also includes an electrically insulating block spacer 250 that may be comprised of BAKELITE (phenol formaldehyde or phenolic) and electrically separates electrical connections 230 and 240.

The core 220 alters the configuration of magnetic fields generated by electrical currents flowing through the electrically conductive structure 210. In particular, because the core 220 has substantial magnetic permeability, the core 220 alters the magnetic fields in regions external to the core 220 in which the object 130 is immersed to establish desired magnetization in the object 130. Establishment of proper magnetization requires confinement of electrical currents to the electrically conductive structure 210. Without confinement of the electrical current, the object 130 is exposed to magnetic fields of improper strength and variation.

However, efficient production of magnetic fields by electrical currents requires close proximity of the core 220 and the electrically conductive structure 210. In fact, since effective magnetization often requires minimal space between the magnetizing fixture 120 and the object 130, the electrically conductive structure 210 must often be embedded in the core 220. Should the core 220 be comprised of an electrically conductive material, such as steel, contact between the core 220 and the electrically conductive structure 210 causes electrical current to leak from the electrically conductive structure 210 and distort the magnetization of the object 130. To overcome this problem, aspects of the invention confine electrical currents within the magnetizing fixture 120 to the electrically conductive structure 210 so as to produce a magnet with desired magnetization. Specifically, aspects of the invention provide an insulator 640 (see FIG. 6) between the conductive structure 210 and the core 220.

Figure 4A:
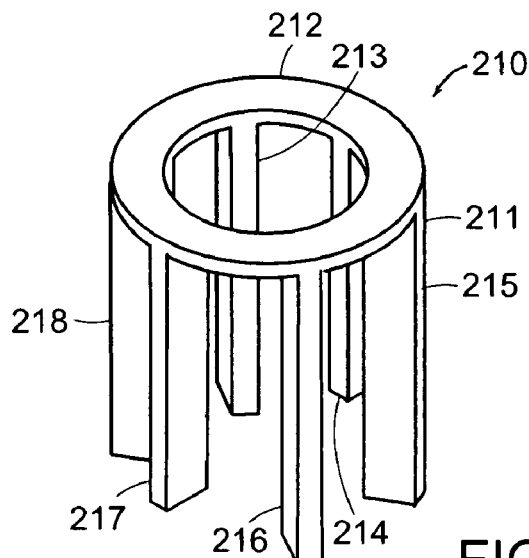
FIG. 4A shows schematically an embodiment of an electrically conductive structure as incorporated in the magnetizing fixture shown in FIG. 2.
Figure 4B:
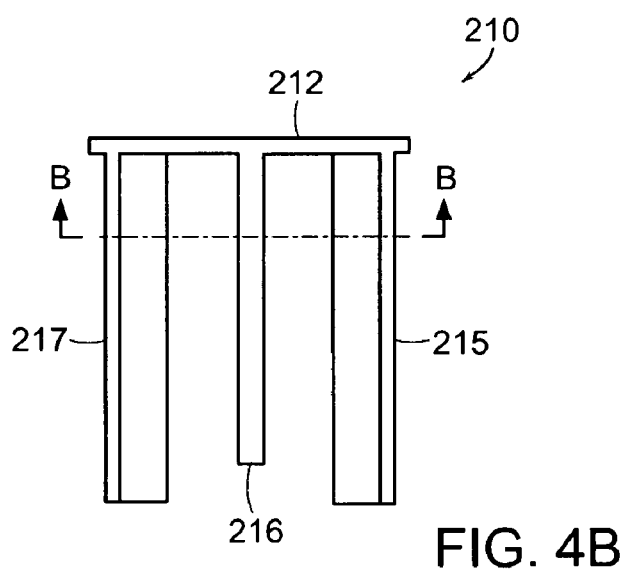
FIG. 4B is a schematic side view and FIG. 4C a schematic top view of the electrically conductive structure.
Figure 4C:
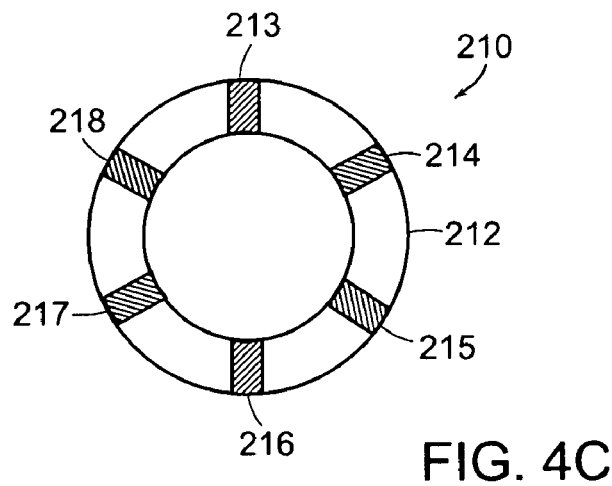
Figure 5A:
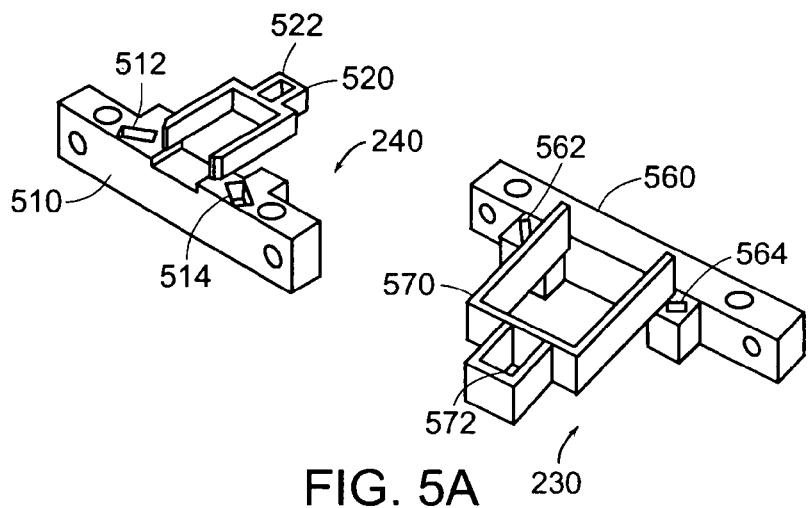
FIG. 5A shows schematically an embodiment of electrical connections as incorporated in the magnetizing fixture shown in FIG. 2.
Figure 5B:
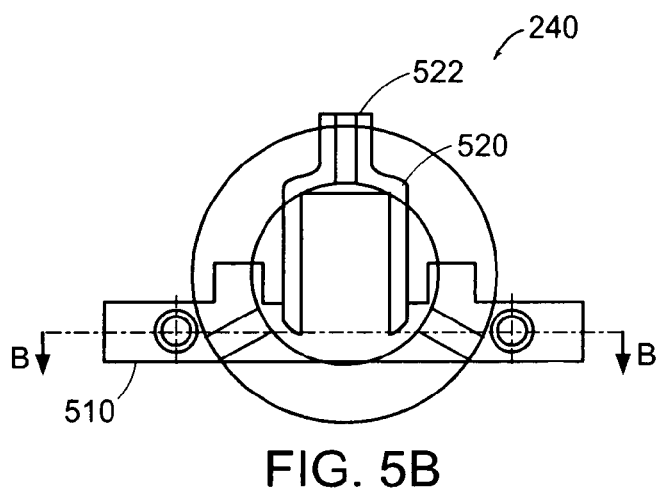
FIG. 5B and FIG. 5C are schematic top and front views respectively of the electrical connection.
Figure 5D:
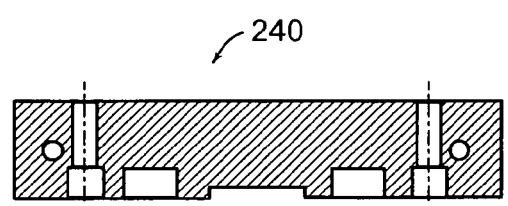
FIG. 5D and FIG. 5E are schematic front and side cross-sectional views respectively of the electrical connection.
Figure 5C:
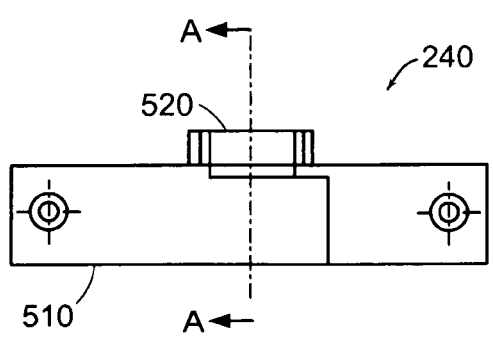
Figure 5E:
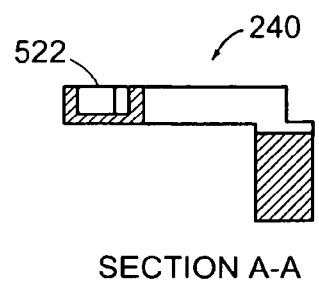
Figure 6A:
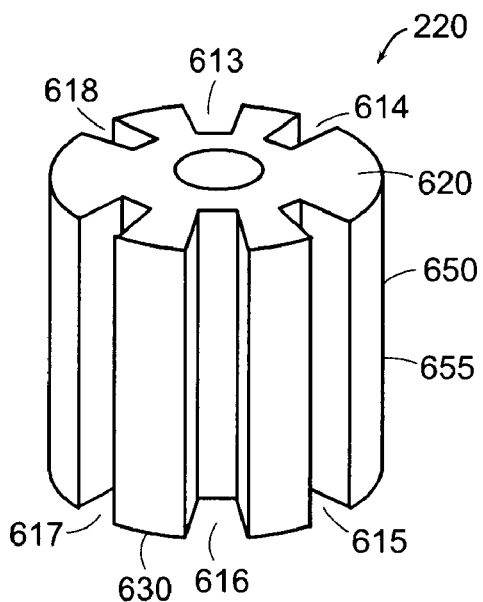
FIG. 6A shows schematically an electrically conductive core of substantial magnetic permeability.
Figure 6B:
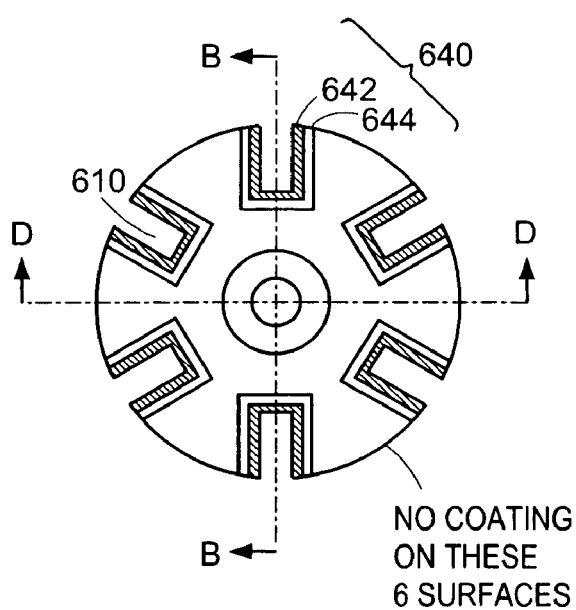
FIG. 6B is a schematic top view of the core.
Figure 6C:
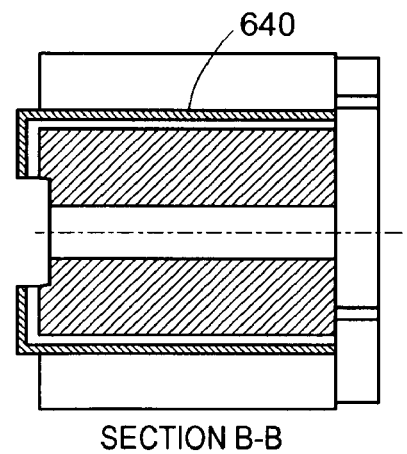
FIG. 6C and FIG. 6D are schematic front and side cross-sectional views respectively of the core.
Figure 6D:
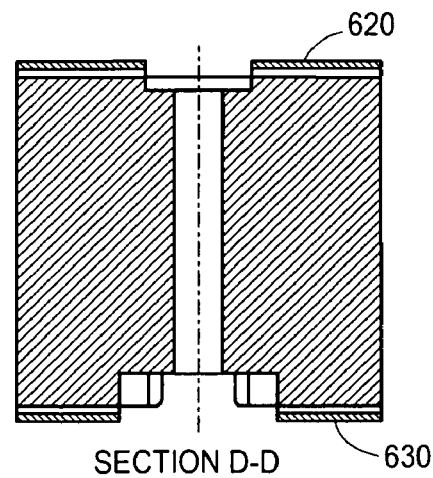

FIG. 4A-4C schematically shows an embodiment of the conductive structure 210, which may be comprised of copper. The electrically conductive elements 213-218 may have a rectangular cross-section and be perpendicular to the electrically conductive top 212, integrally coupling to the electrically conductive top 212 via second ends (e.g., 211). The electrically conductive elements 213-218 may be distributed at equal angular intervals about a circumference of the electrically conductive top 212. Of course, discussion of six electrically conductive elements 213-218 is exemplary and thus not intended to limit the scope of the invention.

FIG. 5A-5E schematically show embodiments of the first and second electrical connections or bars 230 and 240, which may be comprised of copper. The second electrical connection 240 contains a source connector 510 and a suspended connector 522. The source connector 510 may contain a receptacle 512 to receive the electrically conductive element 217 and a receptacle 514 to receive the electrically conductive element 215. The suspended connector 520 may contain a receptacle 522 to receive the electrically conductive element 213. Likewise, the first electrical connection 230 contains a source connector 560 with receptacles 562 and 564 that may receive the electrically conductive elements 218 and 214 and a suspended connector 570 with a receptacle 572 that may receive the electrically conductive element 216.

FIG. 6 schematically illustrates the electrically conductive core 220, which may be comprised of steel. The electrically conductive core 220 contains a top surface 620, a bottom surface 630, and channels 613-618 in a side surface 655 coated with an electrically insulating layer 640. The channels 613-618 are open at the top surface 620, at the bottom surface 630, and along the side surface 655. In some embodiments, the insulating layer 640 comprises an outer or second sublayer 642 and an inner or first sublayer 644. The outer sublayer 642 may contain stabilized zirconia. The inner sublayer 644 may contain a combination of nickel, chromium, aluminum, and yttrium.

Figure 7:
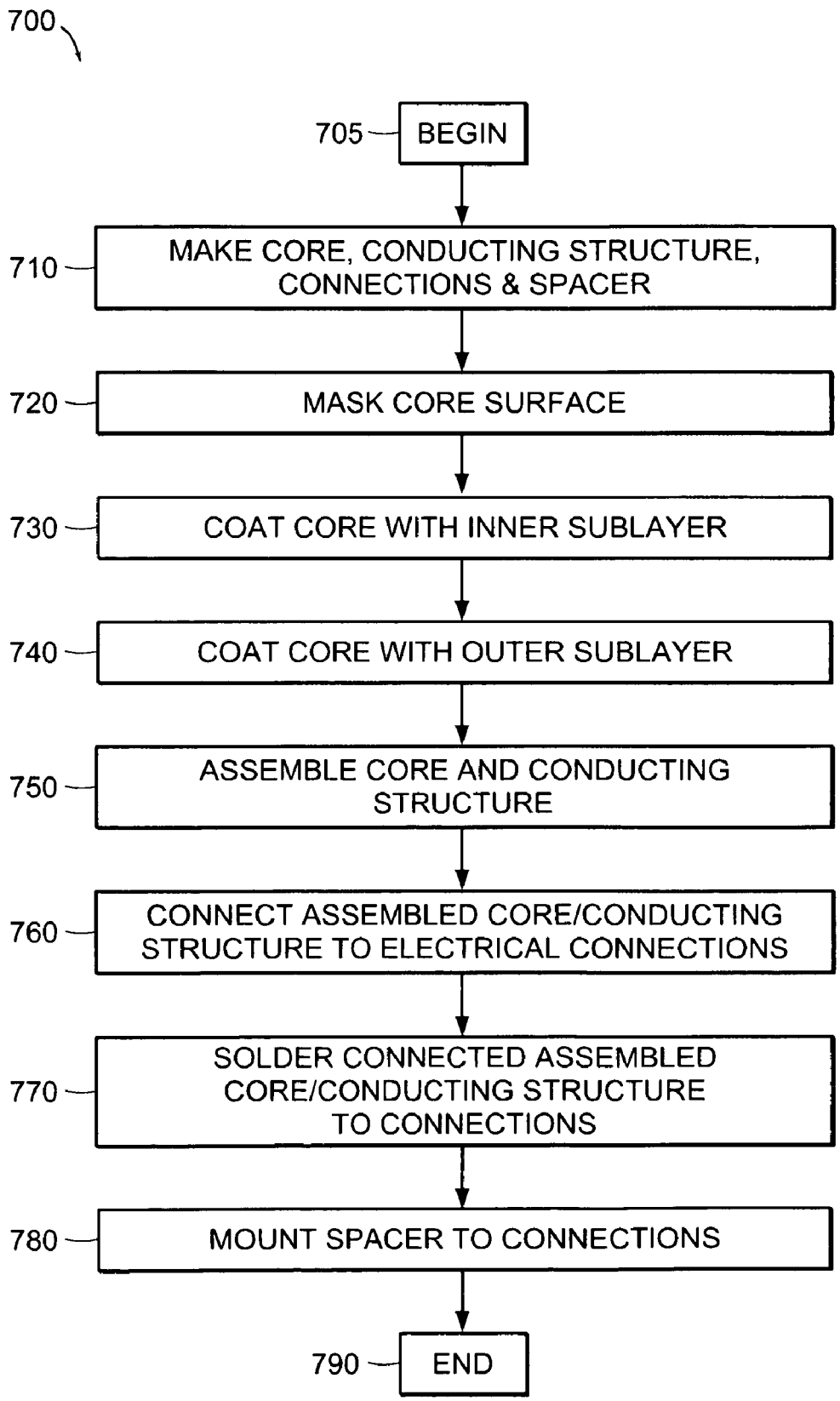
FIG. 7 shows a process for making an embodiment of the magnetizing fixture.

Process 700 for making the magnetizing fixture 120 is summarized in FIG. 7. In Step 710, the electrically conductive core 220, the electrically conductive structure 210, the electrical connections 230 and 240, and electrically insulating block spacer 250 may be made, for example, by machining or molding the core 220 from steel, the conductive structure 210 and electrical connections 230 and 240 from copper, and the block spacer 250 from BAKELITE (or another electrically insulating material).

In Step 720, the core 220 is selectively masked to cover the outer surface 650 and to leave uncovered the top surface 620, the bottom surface 630, and the channels 613-618. Masking may be accomplished by coating the core with photoresist, exposing the top surface 620, the bottom surface 630, and the channels 613-618 to ultraviolet radiation to cure the photoresist in those areas and dissolving away unexposed photoresist.

In Step 730, the core 220 is coated with the inner sublayer 644, by spraying and baking a coating containing a combination of nickel, chromium, aluminum, and yttrium, and in Step 740 with the outer sublayer 642, possibly stabilized zirconia. In Step 750, the outer surface 650 is unmasked, e.g., by dissolving away the exposed photoresist.

In Step 750, the electrically conductive structure 210 couples to the coated core 220. For a conductive structure 210 with elements 213-218 extending from a conductive top 212 and a coated core 220 with channels oriented parallel to the side 655 of the coated core 220, the conductive top 212 may set on top surface 620 of the coated core 220 and the elements 213-218 may lie flush with or be laterally confined, i.e., lying entirely beneath the outer surface 650 of the coated core 220. As a result, adjacent electrically conductive elements, e.g. 217 and 218, are connected to receptacles of different electrical connections.

In Step 760, receptacles 512, 514, and 522 of the second electrical connection 240 receive electrically conductive elements 217, 215, and 213. In Step 770, receptacles 562, 564, and 572 of the first electrical connection 230 receive the electrically conductive elements 218, 214, and 216.

In Step 780, electrically conductive elements 217, 215, and 213 are silver soldered at a temperature above the melting point of silver solder and below the melting points of copper, steel, zirconia, and a combination of nickel, chromium, aluminum, and yttrium to receptacles 512, 514, and 522 and, in Step 790, electrically conductive elements 218, 214, and 216 are similarly silver soldered to receptacles 562, 564, and 572 at the electrically conductive element-receptacle joints (e.g. 205).

To solder, the temperature of the magnetizing fixture 120 is raised to about 800° C. and a small torch is used to locally heat the electrically conductive element-receptacle joints to a temperature above about 940° C. and less than about 1085° C. Since copper melts at about 1085° C., steel at about 1370° C., zirconia at about 2700° C., and Ni—Cr—Al—Y at about 1138° C., and silver solder at about 940° C., soldering does not affect either the core 220, the conductive structure 210, the inner sublayer 644, or the outer sublayer 642.

In Step 790, the block spacer 250 is mounted to separate electrical connections 230 and 240.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A method of constructing a magnetizing fixture, the method comprising:
   providing an electrically conductive structure that forms an interior;
   providing an electrically conductive core of substantial magnetic permeability;
   coating at least a portion of the electrically conductive core with an electrically insulating material to form an insulated core;
   after coating the at least a portion of the electrically conductive core to form the insulated core, assembling at least a portion of the magnetizing fixture by positioning the insulated core within the interior of the conductive structure; and
   wherein the insulated core is secured by soldering the conductive structure to another structure, the soldering being completed at a soldering temperature, the electrically insulating material having a melting temperature that is greater than the soldering temperature.

2. A method of constructing a magnetizing fixture, the method comprising:
   providing an electrically conductive structure that forms an interior;
   providing an electrically conductive core of substantial magnetic permeability;
   coating at least a portion of the electrically conductive core with an electrically insulating material to form an insulated core;
   after coating the at least a portion of the electrically conductive core to form the insulated core, assembling at least a portion of the magnetizing fixture by positioning the insulated core within the interior of the conductive structure; and
   wherein coating includes applying a first layer comprising nickel, chromium, aluminum, and yttrium, and a second layer of stabilized zirconia.

3. A method of constructing a magnetizing fixture, the method comprising:
   providing an electrically conductive structure that forms an interior;

providing an electrically conductive core of substantial magnetic permeability;

coating at least a portion of the electrically conductive core with an electrically insulating material to form an insulated core;

after coating the at least a portion of the electrically conductive core to form the insulated core, assembling at least a portion of the magnetizing fixture by positioning the insulated core within the interior of the conductive structure; wherein the coating includes applying a first and a second insulating sublayer; and wherein the first insulating sublayer includes at least one of nickel, chromium, aluminum, and yttrium and the second sublayer includes stabilized zirconia.

4. A method of constructing a magnetizing fixture, the method comprising:

providing an electrically conductive structure that forms an interior;

providing an electrically conductive core of substantial magnetic permeability;

coating at least a portion of the electrically conductive core with an electrically insulating material to form an insulated core;

after coating the at least a portion of the electrically conductive core to form the insulated core, assembling at least a portion of the magnetizing fixture by positioning the insulated core within the interior of the conductive structure; wherein the coating includes using a mask; and wherein the coating includes a photoresist.

5. A method for magnetizing an object, the method comprising:

providing a magnetizing fixture connected to an electrical power supply having a first and a second electrical connection, the magnetizing fixture comprising:

(a) a first electrical connection to the power supply;
(b) a second electrical connection to the power supply;
(c) an electrically conductive structure comprising a plurality of electrically conductive elements and an electrically conductive top, each element having a first end coupled to one of the first and second electrical connections, each element having a second end coupled to the electrically conductive top; and
(d) an electrically conductive core of substantial magnetic permeability having a top surface coupled to the electrically conductive top, a bottom surface, and plurality of channels communicating from the top surface to the bottom surface, wherein the top and bottom surfaces and the channels are coated with an electrically insulating layer and wherein each electrically conductive element is contained within a channel;

positioning a magnetizable object near the fixture; and using the fixture and power supply to generate a magnetic field so as to magnetize the object.

6. A method according to claim 5, wherein the magnetized object is a stator.

* * * * *